(No Model.)

M. W. HAZELTON.
WIRE ROPE OR CABLE.

No. 301,888. Patented July 15, 1884.

UNITED STATES PATENT OFFICE.

MILTON W. HAZELTON, OF CHICAGO, ILLINOIS.

WIRE ROPE OR CABLE.

SPECIFICATION forming part of Letters Patent No. 301,888, dated July 15, 1884.

Application filed June 5, 1883. (No model.)

*To all whom it may concern:*

Be it known that I, MILTON W. HAZELTON, a citizen of the United States of North America, and a resident of Chicago, county of Cook, State of Illinois, have invented a new and useful Improvement in Wire Ropes or Cables, of which the following is a specification.

The object of this invention is to provide an improved wire rope or cable adapted for transmitting motive power to street-cars and for other purposes. The rope or cable is manufactured after a novel method, which consists in heating the individual wires, in a suitable furnace, to a red heat, or thereabout, and then while they are so heated in twisting or laying them together in the desired form of a rope or cable, whereby the contact surfaces of the wires are somewhat flattened and their frictional resistance relatively to each other to torsional or longitudinal stress greatly increased.

Reference is to be had to the accompanying drawings, forming part of this specification, wherein similar letters of reference indicate corresponding parts in all the figures.

Figure 1:
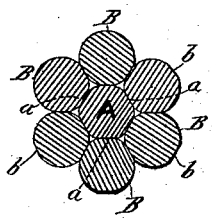
Figure 2:
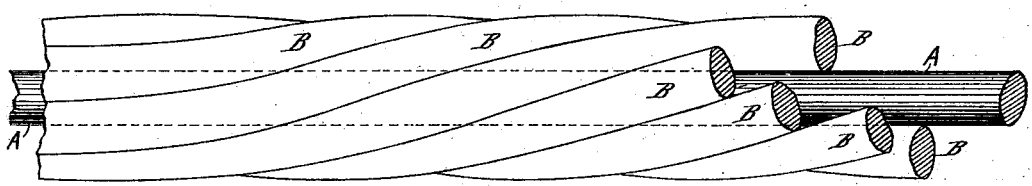

Figure 1 is a cross-section of my improved rope or cable. Fig. 2 is an elevation of a portion of the same with parts broken away to exhibit other parts.

This rope or cable may be made of two or more wires twisted or laid together at a red heat, or thereabout; but the one shown in the drawings is composed of seven wires—a central wire, A, with six wires, B B, twisted or laid about it. To form the separate strands of this rope or cable, wires, preferably of cylindrical cross-section, are welded together end to end, and then drawn through a suitable draw-plate, whereby the welded joints are reduced to a uniform diameter with the rest of the wire. The separate strands or wires are then passed into one end of a long heated furnace, such, preferably, as is used in the manufacture of welded tubes, and drawn out at the opposite end at or near a red heat, and at such temperature twisted or laid together into a rope or cable.

A rope or cable thus made possesses special advantages over one twisted or laid cold, first, in being more compact, and, second, in offering greater resistance to torsional or longitudinal stress, for it happens that the heated wires, when twisted together, lose their cylindrical shape, and at their points of contact with each other become slightly flattened, as shown at *a a*, thereby presenting to each other greatly-increased frictional contact-surfaces, whereby the resisting power of the cable is augmented, as before stated, and by this flattening of the contact-surfaces of the individual wires or strands the rope or cable is also made more compact—of smaller diameter—than a cold-twisted cable from wires of the same size and number.

In the manufacture of a hot-twisted steel cable or rope the individual wires are preferably heated in an atmosphere of carbonic-oxide gas, that the quality of the steel may not be impaired. I preferably make use of wires or rods of spring-steel in manufacturing this rope or cable, so that after the rope or cable is twisted hot and becomes cool each individual spring-steel wire or rod will retain and assert its twisted or spiral form in opposition to contrary stress; each wire or rod—excepting in some instances the central one—will, on cooling, set in a spiral possessing the well-known constant tendency of steel springs to return to its normal shape after removal of applied strain or pressure. A cold-twisted spring-steel rope or cable would not possess the special advantages of the hot-twisted one, because of the constant tendency of the individual rods, wires, or strands to untwist and return to their normal straight conditions; hence, although a cable or rope hot-twisted from ordinary iron or steel wires or rods possesses some important advantages over a cold-twisted rope or cable of like material, it is obvious that a hot-twisted spring-steel rope or cable is eminently superior to all others in its resistance to direct or torsional stress.

Having thus described my invention, I claim as new and desire to secure by Letters Patent—

1. The method, substantially as herein described, of manufacturing wire rope or cable, consisting in heating the individual wires to a red heat, or thereabout, and then, while they are so heated, twisting or laying them together in the form of a rope or cable, as set forth.

2. A wire rope or cable made by twisting or laying red-hot wires together, substantially as herein set forth.

3. A wire rope or cable made of spring-steel wires or rods laid or twisted together while hot, substantially as herein set forth.

In testimony that I claim the foregoing as my invention I have signed my name, in presence of two witnesses, this 24th day of May, A. D. 1883.

MILTON W. HAZELTON.

Witnesses:
L. FREIBERGER,
N. A. BISHOP, Jr.